Aug. 24, 1965  D. S. STRADER  3,202,238
HYDRAULIC STEERING SYSTEMS
Filed Sept. 14, 1961  2 Sheets-Sheet 1

Fig. 1.

INVENTOR.
Don S. Strader
BY Paul Pipes
Atty.

Aug. 24, 1965  D. S. STRADER  3,202,238

HYDRAULIC STEERING SYSTEMS

Filed Sept. 14, 1961  2 Sheets-Sheet 2

Fig. 2.

INVENTOR.
Don S. Strader
BY Paul O. Pippel
Atty.

United States Patent Office 3,202,238
Patented Aug. 24, 1965

3,202,238
HYDRAULIC STEERING SYSTEMS
Don S. Strader, Mount Prospect, Ill., assignor to The Frank G. Hough Co., a corporation of Illinois
Filed Sept. 14, 1961, Ser. No. 138,107
25 Claims. (Cl. 180—79.2)

This invention relates generally to motor vehicle hydraulic steering systems, and more particularly to a four wheel hydraulic steering system for a motor vehicle.

The primary object of the present invention is to provide a novel four wheel steering system for a motor vehicle which may be adjusted for two wheel steering, four wheel coordinated steering, and four wheel crab steering without using any mechanical elements between the forward and rearward wheels for achieving the different steering patterns.

It is a further object to provide a hydraulically operated and hydraulically controlled four wheel steering system for a motor vehicle which does not require indicators in the operator's compartment nor manual correction of the rear wheels for alignment or realignment with the front wheels of the vehicle.

It is still another object to provide a novel, simple and efficient hydraulic steering system for a four wheel steered vehicle wherein the steering is accomplished hydraulically and the different steering patterns are achieved by operation of a simple hydraulic valve.

Still another object is to provide in steering systems as above described, certain novel means providing automatic return of the forward and rearward wheels to the straight-ahead driving position whenever steering effort is released from the steering wheel.

Other objects and features of the invention will be apparent upon a perusal of the following specification and drawings, in which.

The present embodiments are the preferred embodiments, but it is to be understood that changes can be made in the present embodiments by one skilled in the art without departing from the spirit and scope of the present invention.

Generally, the invention comprises a motor vehicle having a pair of forward steerable wheels and a pair of rearward steerable wheels with no mechanical steering or steering control connection between the forward and rearward wheels. Three hydraulic fluid pumps are provided, two of which are driven by the engine of the motor vehicle, and, the third being driven by the steering wheel of the motor vehicle. One of the engine driven pumps provides hydraulic fluid under pressure for steering the forward and rearward wheels. The second engine driven pump provides hydraulic fluid pressure for the rearward wheels to align the rearward wheels in the straight-ahead driving position relative to the forward wheels should for any reason a reorientation of those wheels be required. The output of the steering wheel driven pump is connected to a follow-up cylinder, a pilot operated hydraulic valve for the forward wheels, and a manually operated hydraulic valve. The manually operated hydraulic valve in turn is connected to a second pilot operated hydraulic valve for the rear wheels of the vehicle. The manually operated valve has three positions, one which prevents any steering of the rearward wheels of the vehicle so that the vehicle is merely steered by the forward wheels, a second position wherein the rearward wheels are steered in a coordinated pattern relative to the forward wheels, and a third position wherein the rearward wheels are steered in a crab steering pattern. In the coordinated steering pattern, the rearward wheels are turned in the opposite direction from the forward wheels so that the rearward wheels tend to follow the tracks of the forward wheels. In a crab steering pattern, the rearward wheels are turned in the same direction as the forward wheels so that the vehicle moves somewhat sideways in addition to moving either forwardly or rearwardly.

In the present embodiments the forward and rearward wheels are steered by a plurality of hydraulic cylinders which are connected between the axles and the wheels of the vehicle. When the steering wheel is turned, the steering wheel operated pump produces hydraulic fluid pressure on the pilot operated valve for the forward wheels. The pilot operated valve for the forward wheels is then operated to direct hydraulic fluid under pressure from the first engine driven pump to the forward wheels for steering thereof. If the steering wheel is held in some rotated position, the follow-up cylinder will operate to release the fluid pressure from the steering wheel pump to permit the front wheel pilot operated valve to return to the neutral position, the front wheels of course remaining turned until the steering wheel is operated in the opposite direction to bring the forward wheels back to the straight-ahead driving position. If the manually operated steering pattern selector valve is operated to some position other than the position for forward wheel steering of the vehicle, hydraulic fluid from the steering wheel pump is also delivered to the second pilot operated valve, that for the rearward wheels of the vehicle. That hydraulic valve will operate to direct hydraulic fluid from the first pilot operated valve to the rearward wheels for steering thereof.

The alignment or correction system for the rearward wheels is controlled by a valve connected to the forward wheels. When the forward wheels are in the straight-ahead driving position, that valve permits the second engine driven pump to develop hydraulic fluid pressure, and that hydraulic fluid under pressure is delivered to a certain hydraulic valve which is operated by the rearward wheels. The hydraulic fluid under pressure from the second engine driven pump will be delivered through the rear wheel operated valve to the rear wheels to cause the rear wheels to be turned toward the straight-ahead position, and when that position is attained, the rear wheel operated valve is moved to a center position cutting off the hydraulic fluid flow from the second engine driven pump to the rearward wheels. The alignment system is particularly useful after an operation of the steering pattern selector valve, when the rearward wheels may be misaligned.

The further feature of the second embodiment of providing automatic return of the wheels to the straight-ahead driving position whenever after some steering effort, the steering wheel is released, utilizes a hydraulic control circuit including certain check valves cooperating with a forward wheel connected control valve to provide means directing fluid from the second engine operated pump to the pilot operated valves for the forward and rearward wheels to return all of the wheels of the vehicle to the straight-ahead driving position when after some turning thereof, the steering wheel is released. The forward wheel connected control valve also controls the rearward wheel centering system.

Figure 1:
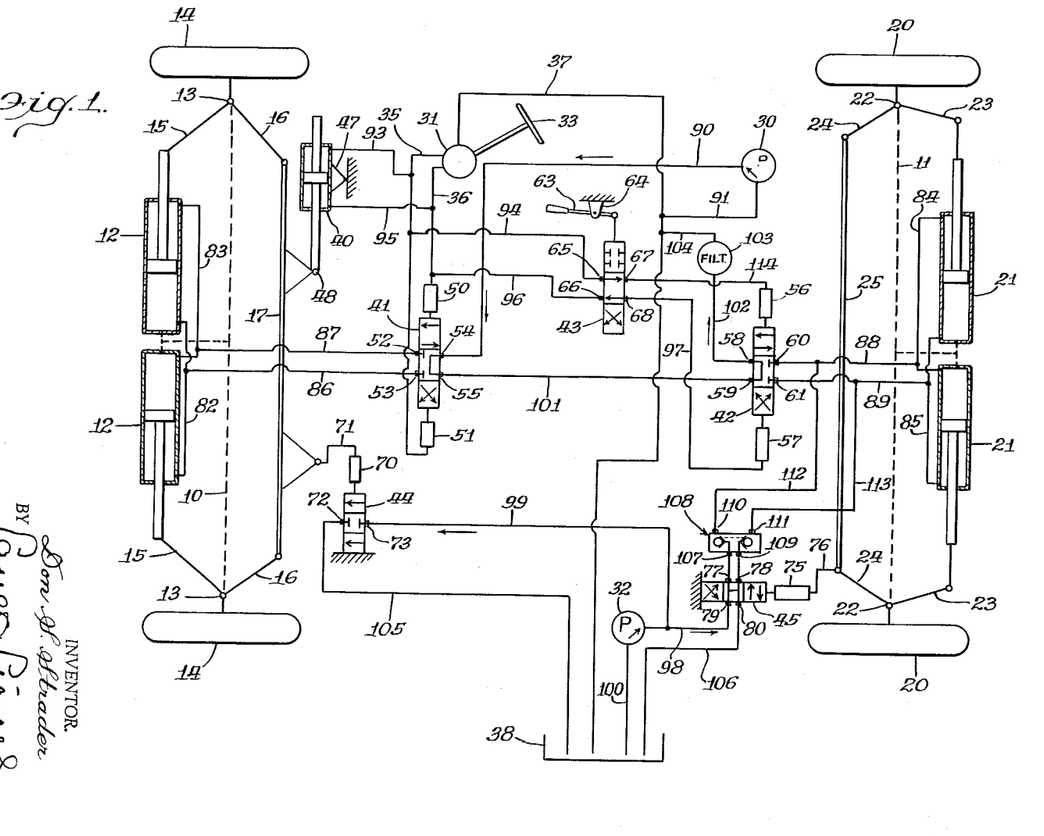
FIGURE 1 is a diagrammatic view of a motor vehicle constructed according to the invention.

In detail, the portion of the motor vehicle shown diagrammatically in FIGURE 1 comprises a forward axle 10 and a rearward axle 11. The forward axle 10 carries a pair of hydraulic rams or cylinders 12 and the kingpin assemblies 13 for the forward wheels 14. Any suitable type of axle construction known in the art may be used. The cylinder portions of the hydraulic rams 12 are pivotally connected to the axle 10, and the piston rods of the rams 12 are connected to the steering arms 15 for steering the forward wheels 14. As in conventional axle constructions, arms 16 secured to the forward wheels 14 to turn therewith are interconnected at their outer ends by a rigid link or tie rod 17.

The rearward wheels 20 are steeringly carried on the rear axle 11. The rear axle 11 carries the cylinder portions of the rear axle steering rams 21 and the kingpin assemblies 22. The kingpin assemblies 22 carry the rear wheels 20 for steering movement. The rod ends of the hydraulic rams 21 are pivotally connected to the steering arms 23 for the rear wheels 20. The rearward wheels 20 also carry arms 24, the outer ends of which are interconnected by a rigid link or tie rod 25.

The steering system comprises three hydraulic fluid pumps 30, 31 and 32. Pumps 30 and 32 are connected to be driven by the engine of the motor vehicle. Pump 31 is connected to be driven by the steering wheel 33. The steering wheel 33 is conveniently carried in the operator's compartment of the motor vehicle. The pump 31 may be of any well known construction wherein, hydraulic fluid pressure is developed at the outlet of the pump 31 connected to conduit 35 when the steering wheel 33 is turned to the right, and, hydraulic fluid pressure is developed at the outlet connected to conduit 36 when the steering wheel 33 is turned to the left. The steering wheel pump 31 is also constructed so that the outlet which is not pressurized is connected to conduit 37. The other end of conduit 37 is connected to the hydraulic fluid reservoir 38 to maintain fluid supply to the pilot circuit.

The hydraulic steering system further comprises a follow-up cylinder 40, a pilot operated hydraulic valve 41 for the front wheels 14, a pilot operated hydraulic valve 42 for the rear wheels 20, a steering pattern selector valve 43, an unloading valve 44, and a rear wheel centering valve 45.

The follow-up cylinder 40 has the cylinder portion thereof anchored, as at 47, to some portion of the frame of the motor vehicle. The piston rod of the follow-up cylinder 40 is pivotally connected at 48 to the tie rod 17 for the forward wheels 14. The follow-up cylinder 40 is so arranged relative to the forward wheel and axle assembly that when the piston head of the cylinder 40 is substantially at the center thereof, the forward wheels 14 are positioned in the straight-ahead driving position.

The pilot operated valves 41 and 42 are three position valves and are each provided with a small hydraulic pilot cylinder at each end thereof for operating the valve spools thereof to any one of the three positions thereof. The valve spools are spring biased to the center position. The pilot operated valves 41 and 42 may be of any suitable type known in the art which will perform the hereinafter described functions. The pilot operated valve 41 has a cylinder 50 at one end thereof and a cylinder 51 at the other end thereof. Four valve ports 52, 53, 54 and 55 also are provided, and the valve 41 is constructed so that when the valve is in the center position as shown in the drawings, ports 52 and 53 are blocked and ports 54 and 55 are interconnected through the valve 41. Further, when hydraulic fluid under pressure is supplied to the cylinder 50, the valve 41 is operated to a position wherein ports 52 and 54 are interconnected, and ports 53 and 55 are interconnected, through the valve. When hydraulic fluid under pressure is applied to the cylinder 51, the valve 41 is operated to a position wherein ports 52 and 55 are interconnected, and ports 53 and 54 are interconnected, through the valve.

The pilot operated valve 42 is constructed in a similar manner to valve 41 and is provided with a hydraulic cylinder 56 at one end thereof and a hydraulic cylinder 57 at the other end thereof. The valve 42 is further provided with four ports 58, 59, 60 and 61. The valve 42 is constructed so that when no hydraulic fluid under pressure is delivered to either cylinder 56 or 57, the valve is spring biased to the center position, and ports 58 and 59 are interconnected through the valve, and ports 60 and 61 are blocked by the valve. When hydraulic fluid under pressure is delivered to cylinder 56, the valve 42 is operated to a position wherein ports 58 and 60 are interconnected, and ports 59 and 61 are interconnected, through the valve. When hydraulic fluid under pressure is delivered to hydraulic cylinder 57, the valve 42 is operated to the third position wherein ports 59 and 60 are interconnected, and ports 58 and 61 are interconnected, through the valve.

The manually operated steering pattern selector valve 43 is also a three position valve. Valve 43 has a spool slidably carried therein which is pivotally connected to a hand lever 63, which in turn is pivotally carried in the motor vehicle by a bracket means 64. Valve 43 further comprises four ports 65, 66, 67 and 68. The valve 43 may be of any suitable type known in the art providing the hereinafter described functions. When the valve 43 is in the center position such as shown in the drawing, which is the position for the coordinated steering pattern of the forward and rearward wheels, ports 65 and 67 are interconnected, and ports 66 and 68 are interconnected, through the valve. When the hand lever 63 is moved downwardly as viewed in the drawings, the valve 43 is operated to the position for the crab pattern of steering of the wheels and ports 65 and 68 are interconnected, and ports 66 and 67 are interconnected through the valve. When the valve 43 is moved to its third position by an upward movement of the hand lever 63 as viewed in the drawings, the steering pattern for front wheel steering only is provided and each of the ports 65, 66, 67 and 68 are blocked by the valve.

The unloading valve 44 is fixedly carried in the vehicle in cooperation with the tie rod 17 of the forward wheels 14. The unloading valve 44 is a three position valve and the valve spool thereof is connected to spring biasing means 70 which in turn is connected by linkage means 71 to the tie rod 17. Valve 44 is provided with two ports 72 and 73. The valve 44 may be of any suitable type known in the art which will operate as hereinafter described. The spring biasing means 70 biases the valve 44 to the center position such as shown in the drawings when the wheels 14 are in the straight-ahead driving position. In this operated position of the valve 44, ports 72 and 73 are blocked by the valve. When the wheels 14 are turned to either side of the straight-ahead position, the linkage means 71 acting through the spring biasing means 70 will operate the valve 44 to one of the other positions. In each of the other positions of the valve 44, ports 72 and 73 are interconnected through the valve.

The rear wheel centering valve 45 is a three position valve and the spool thereof is connected by spring biasing means 75 and linkage means 76 to the tie rod 25 of the rear wheels 20. The valve 45 may be of any suitable type known in the art, operating as hereinafter described. The spring biasing means 75 biases the valve 45 to the center position shown in the drawings when the rear wheels 20 are aligned in the straight-ahead driving position. When the valve 45 is in the center position, ports 77, 78, 79 and 80 are all interconnected through the valve. When the rear wheels are turned toward the right, linkage means 76 acting through spring biasing means 75 will move the spool of the valve 45 to a position wherein ports 77 and 80 are interconnected, and ports 78 and 79 are interconnected, through the valve. When the rear wheels 20 are turned toward the left, the valve 45 is operated to the third position wherein ports 77 and 79 are interconnected, and ports 78 and 80 are interconnected, through the valve.

Figure 2:
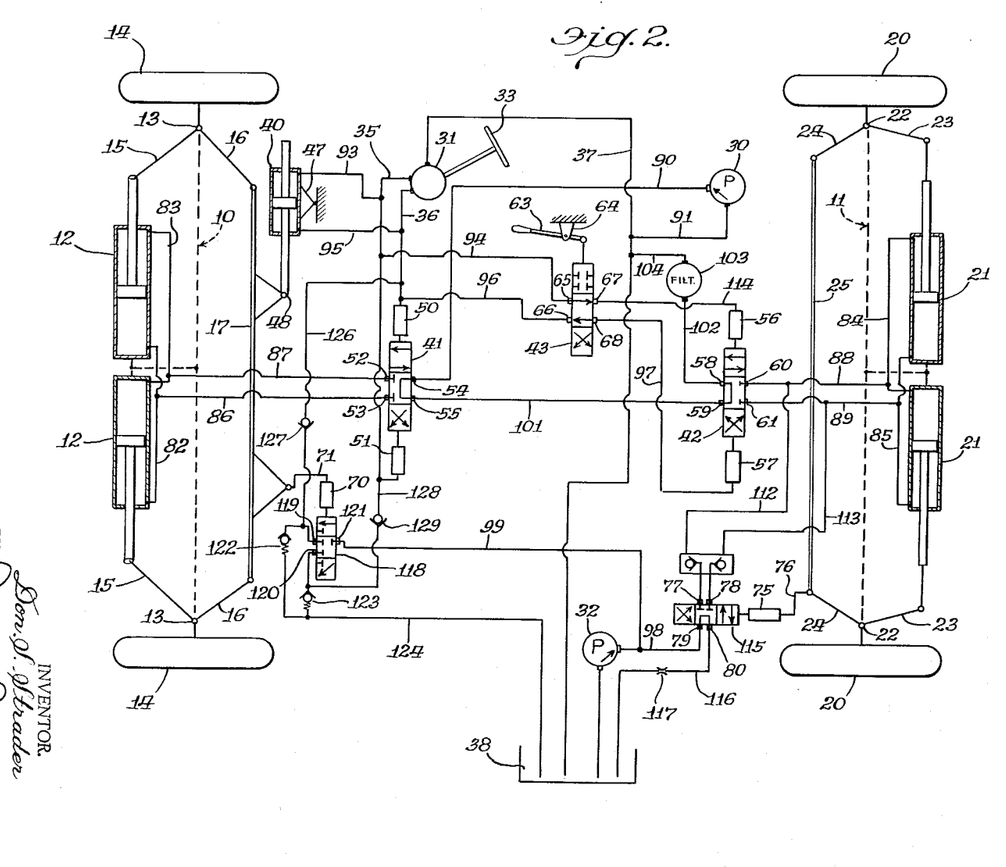
FIGURE 2 is a diagrammatic view similar to FIGURE 1 but further showing automatic means for returning the wheels to the straight-ahead position when steering effort is released from the steering wheel.

The embodiment of the invention shown in FIGURE 2 includes all of the various elements above described except that the valves 44 and 45 are modified in certain respects to provide the feature of automatic return of the wheels to the straight-ahead position when the steering wheel 33 is stopped and then released after some rotation thereof. When the feature of automatic return of the wheels to the straight-ahead position is operating, the cylinder 40 will operate the pump 31 as a motor to turn the steering wheel 33 toward the straight-ahead position in a manner similar to that of a mechanical steering system.

Various hydraulic fluid conduits interconnect the above described elements in a particular manner to accomplish the objects of the invention. As may be seen in FIGURE 1, the head end of one hydraulic ram 12 is connected to the rod end of the other hydraulic ram 12 by a conduit 82, and the head end of the latter hydraulic ram 12 is connected to the rod end of the former hydraulic ram 12 by a conduit 83. The hydraulic rams 21 for the rear wheels 20 are connected in a similar manner, the head end of one hydraulic ram being connected to the rod end of the other hydraulic ram 21 by a conduit 84 and the rod end of the latter hydraulic ram being connected to the head end of the former hydraulic ram 21 by conduit 85. Thus it may be seen that when hydraulic fluid under pressure is delivered to conduit 82, the front wheels 14 are steered to the right, and when hydraulic fluid under pressure is delivered to conduit 83 the front wheels 14 are steered to the left. When hydraulic fluid under pressure is delivered to conduit 84, the rear wheels 20 are steered to the right, and when hydraulic fluid under pressure is delivered to conduit 85, the rear wheels 20 are steered to the left.

Hydraulic fluid conduit 82 is connected by conduit 86 to port 53 of the pilot operated steering valve 41. Conduit 83 is connected by conduit 87 to port 52 of valve 41. Conduit 84 is connected by conduit 88 to port 60 of the pilot operated valve 42, and conduit 85 is connected by conduit 89 to port 61 of valve 42.

The pressure side of the engine operated pump 30 is connected by conduit 90 to port 54 of valve 41. The suction side of the pump 30 is connected by conduit 91 to conduit 37 which has previously been described as connected into the reservoir 38.

Conduit 35 from the steering pump 31 is connected to the cylinder 51 of valve 41. Conduit 35 is also connected to one end of conduits 93 and 94. The other end of conduit 93 is connected to one end of the follow-up cylinder 40, and the other end of conduit 94 is connected to port 65 of the steering pattern selector valve 43. Conduit 36 from the steering pump 31 is connected to the cylinder 50 of valve 41, and is further connected to one end of the conduits 95 and 96. The other end of conduit 95 is connected to the other end of the follow-up cylinder 40, and the other end of conduit 96 is connected to port 66 of the steering selector valve 43. Thus it may be seen that when the steering wheel 33 is turned to the right, hydraulic fluid pressure is developed in conduit 35 and applied to the follow-up cylinder 40, cylinder 51 of valve 43, and port 65 of valve 43. When the steering wheel 33 is turned to the left, hydraulic fluid under pressure is applied to the follow-up cylinder 40, the cylinder 50 of valve 41, and port 66 of valve 43.

The pressure side of pump 32 is connected by conduit 98 to port 79 of valve 45, and by conduit 99 to port 73 of the unloading valve 44. The suction side of the pump 32 is connected by conduit 100 to the reservoir 38.

Valve 41 is further connected at port 55 to one end of a conduit 101, and the other end of conduit 101 is connected to port 59 of valve 42.

Port 58 of valve 42 is connected by conduit 102 to the hydraulic fluid filter 103. The hydraulic fluid filter 103 in turn is connected by conduit 104 to the conduit 37 which has previously been noted as connected to reservoir 38.

Port 68 of selector valve 43 is connected by conduit 97 to cylinder 57 of valve 42, and port 67 is connected by conduit 114 to cylinder 56 of valve 42.

Port 72 of the unloading valve 44 is connected by conduit 105 to the reservoir 38.

Port 80 of the rear wheel centering valve 45 is connected by conduit 106 to the reservoir 38. Port 77 of valve 45 is connected by an obvious conduit to port 107 of the locking valve 108. The locking valve 108 is provided for separating the steering system for the rear wheels from the centering system therefor when the rear wheels are being steered, and comprises in addition to port 107, three other ports 109, 110 and 111. The locking valve 108 may be of any suitable type known in the art which will operate as hereinafter described. The valve 108 includes two one-way check valves, one being connected to port 107, and the other being connected to port 109. When hydraulic fluid under pressure is applied to port 107, the fluid may freely flow through the locking valve 108 to port 110, and when hydraulic fluid under pressure is applied to port 109, the hydraulic fluid may freely flow through the locking valve 108 to port 111. When no hydraulic pressure is applied to either port 107 or 109, the check valves in the locking valve 108 will prevent any hydraulic fluid from flowing from ports 110 or 111 through the valve to ports 107 and 109. However, when hydraulic fluid under pressure is applied to either port 107 or 109, the check valves are so arranged that hydraulic fluid may return through the valve from either port 110 or 111. Port 110 of locking valve 108 is connected by conduit 112 into conduit 88, and port 111 is connected by conduit 113 into conduit 89.

In describing the operation of the embodiment shown in FIGURE 1, it may first be assumed that the wheels 14 and 20 are in the straight-ahead driving position and that the steering wheel 33 is not being turned. Hydraulic fluid from pump 30 will flow through conduit 90, port 54 of valve 41, valve 41 and port 55 thereof, conduit 101, port 59 of valve 42, valve 42 and port 58 thereof, conduit 102, filter 103, conduit 104, conduit 37, and conduit 91 to the suction side of the pump 30. Hydraulic fluid will flow from pump 32 through conduit 98, port 79 of the centering valve 45, valve 45 and port 80 thereof, and conduit 106 to the reservoir 38. As the fluid flow from pumps 30 and 32 circulates as above described, the forward wheels 14 will remain in the straight-ahead position since conduits 86 and 87 respectively, are blocked at ports 53 and 52 of valve 41. Further, the rear wheels 20 will remain in the straight-ahead driving position since conduits 88 and 89 respectively, are blocked at ports 60 and 61 of valve 42.

Assuming next that the selector valve 43 is operated to the center position as shown in the drawing, the coordinated steering pattern position, and further assuming that the steering wheel 33 is turned to the right, hydraulic fluid pressure will be developed in conduit 35 by the steering pump 31. The hydraulic fluid pressure in conduit 35 will cause cylinder 51 to operate valve 41 so that ports 52 and 55 are interconnected and ports 53 and 54 are interconnected. The hydraulic pressure in conduit 35 will further operate cylinder 56, which in turn will operate valve 42 to cause ports 58 and 60 to be interconnected and to cause ports 59 and 61 to be interconnected through the valve.

Hydraulic fluid from pump 30 will then flow through conduit 90, port 54 of valve 41, valve 41 and port 53 thereof, conduit 86, and conduit 82 to the cylinders 12. As the cylinders are moved to turn the front wheels 14 to the right, hydraulic fluid will flow from the cylinders 12 to conduit 83, conduit 87, port 52 of valve 41, valve 41 and port 55 thereof, conduit 101, port 59 of valve 42, valve 42 and port 61 thereof, conduit 89, and conduit 85 to the cylinders 21. The cylinders 21 will cause the wheels 20 to be turned to the left, and as the wheels 20 turn to the left, hydraulic fluid will flow from the cylinders 21, through conduit 84, conduit 88, port 60 of valve 42, valve 42 and port 58 thereof, conduit 102, filter 103, conduit 104, conduit 37, and conduit 91 to the suction side of the pump 30. Thus it may be seen that with the valve 43 in the position for coordinated steering, turning of the steering wheel to the right results in a right-hand turning of the forward wheels 14 and a corresponding left-hand turning of the rearward wheels 20.

If the rotation of steering wheel 33 to the right is then stopped, the front wheels 14 in turning to the right will operate the follow-up cylinder 40 to draw hydraulic fluid from conduit 93 and to deliver hydraulic fluid to conduit 95. This operation of the follow-up cylinder 40 will cause the pressure in conduit 35 to drop, and the drop in hydraulic fluid pressure at cylinders 51 of valve 41 and 56 of valve 42 will permit those valves to return to their normal center positions as shown in the drawings. The wheels 14 and 20 will thus remain in the turned positions, pending some re-operation of the steering wheel 33. It should be noted that the hydraulic fluid flow from pump 30 is directed by the various above described parts of the invention in series through the front wheel cylinders 12 and the rear wheel cylinders 21 and then back to the pump 30.

Assuming next that with the steering pattern selector valve 43 remaining in the position for coordinated steering, the steering wheel 33 is turned to the left. The steering pump 31 will then develop hydraulic fluid pressure in conduit 36, and that hydraulic fluid pressure will be applied to cylinder 50 of valve 41, and cylinder 57 of valve 42. Valve 41 will be operated to the position wherein ports 52 and 54 thereof are interconnected and ports 53 and 55 are interconnected. Valve 42 will be operated to the position wherein ports 59 and 60 thereof are interconnected and ports 58 and 61 are interconnected. Hydraulic fluid from pump 30 will then flow through conduit 90, port 54 of valve 41, and port 52 thereof, conduit 87, and conduit 83 to the hydraulic cylinders 12. The hydraulic cylinders 12 in operating will cause the wheels 14 to be turned to the left, and as the wheels 14 turn to the left, hydraulic fluid from cylinders 12 will flow into conduit 82, through conduit 86, port 53 of valve 41, valve 41 and port 55 thereof, conduit 101, port 59 of valve 42, valve 42 and port 60 thereof, conduit 88, and conduit 84 to the cylinders 21. The cylinders 21 will cause the rear wheels 20 to be turned to the right, and as the wheels 20 turn to the right, hydraulic fluid from cylinders 21 will flow through conduit 85, conduit 89, port 61 of valve 42, valve 42 and port 58 thereof, conduit 102, filter 103, conduit 104, conduit 37, and conduit 91 to the suction side of the pump 30. Thus it may be seen that with the valve 43 in the position for coordinated steering, a turning of the steering wheel to the left causes the forward wheels 14 to be turned to the left and the rearward wheels 20 to be turned to the right. If the steering wheel 33 is stopped, the follow-up cylinder 40 will, in moving to follow the left-hand turning of the forward wheels 14, draw fluid from conduit 95 dropping the pressure in conduit 36 to cause the valves 41 and 42 to return to their normal center positions.

Assuming next that the steering pattern selector valve 43 is operated to the crab steering pattern position, that wherein ports 65 and 68 thereof are interconnected, while ports 66 and 67 thereof are interconnected and assuming further that the steering wheel 33 is turned to the right, the right-hand turning of the steering wheel 33 will cause the valve 41 to be operated as previously described. The cylinder 51 will be operated to cause ports 52 and 55 of valve 41 to be interconnected, while ports 53 and 54 thereof are interconnected. The hydraulic fluid under pressure in conduit 35 will now pass through conduit 94, port 65 of valve 43, valve 43 and port 68 thereof, and conduit 97 to cylinder 57 of valve 42. Cylinder 57 will operate valve 42 to cause ports 58 and 61 to be interconnected, while ports 59 and 60 are interconnected. The operation of the valve 41 will cause the wheels 14 to be turned to the right as previously described. In this instance, the rear wheels 20 will also be turned to the right over the following circuit: from port 55 of valve 41, conduit 101, port 59 of valve 42, valve 42 and port 60 thereof, conduit 88, and conduit 84 to the cylinders 21. The cylinders 21 in turning the wheels 20 to the right will substantially match the turning of the forward wheels 14 to the right. Hydraulic fluid from the cylinders 21 will flow through conduit 85, conduit 89, port 61 of valve 42, valve 42 and port 58 thereof, conduit 102, filter 103, conduit 104, conduit 37, and conduit 91 to the suction side of the pump 30. With the steering wheel 33 stopped, the follow-up cylinder 40 will function as previously described to reduce the pressure in conduit 35 to permit the valves 41 and 42 to return to their center positions.

Assuming further that the steering wheel 33 is turned to the left when the steering selector valve 43 is in the crab steering position, the forward wheels 14 will be turned to the left by the hydraulic fluid pressure developed in conduit 36 by the steering pump 31, and the steering of the wheels 14 will occur substantially as previously described for the left-hand turning of the steering wheel 33. The fluid pressure in conduit 36 will also be applied through conduit 96, port 66 of valve 43, valve 43 and port 67 thereof, and conduit 114 to cylinder 56 of valve 42. Valve 42 will then be operated to the position wherein ports 58 and 60 are interconnected while ports 59 and 61 are interconnected. The hydraulic fluid from the forward cylinders at port 55 will pass through conduit 101, port 59 of valve 42, valve 42 and port 61 thereof, conduit 89, and conduit 85 to the cylinders 21 to cause a left-hand steering thereof corresponding to the left-hand steering of the forward wheels 14. Hydraulic fluid from the cylinders 21 will pass through conduit 84, conduit 88, port 60 of valve 42, valve 42 and port 58 thereof, conduit 102, filter 103, conduit 104, conduit 37, and conduit 91 to the suction side of the pump 30. If the steering wheel 33 is stopped, the follow-up cylinder 40 will operate as previously described to return the valves 41 and 42 to their center positions, maintaining the wheels 14 and 20 in the position to which they have been turned.

From the foregoing, the operation of the invention for steering with the forward wheels 14 only is obvious. The steering selector valve 43 is operated to the position wherein ports 65, 66, 67 and 68 are blocked for front wheel steering, and the front wheels 14 are steered as previously described with fluid from port 55 of valve 41 being directed through conduit 101, port 59 of valve 42, valve 42 and port 58 thereof, conduit 102, filter 103, conduit 104, conduit 37 and conduit 91 to the suction side of pump 30.

To describe the rear wheel centering system, it may be assumed that the forward wheels 14 are in the straight-ahead position, such as shown in FIGURE 1, and that rear wheels 20 are turned to the right. With the wheels 20 turned to the right, the valve 45 will be operated through the spring biasing means 75 and the linkage means 76 to a position wherein ports 77 and 80 thereof are interconnected, while ports 78 and 79 thereof are interconnected. With the forward wheels in the straight-ahead position, the dumping valve 44 is positioned to block conduit 99. Thus the hydraulic fluid delivered by pump 32 will be applied through conduit 98 to port 79 of valve 45, and through valve 45 and port 78 thereof to port 109 of valve 108, and from valve 108 and port 111 thereof through conduit 113, conduit 89, and conduit 85 to the cylinders 21. The hydraulic fluid pressure applied to the cylinders 21 through conduit 85 will cause the wheels 20 to be turned to the left toward the straight-ahead driving position. As the wheels 20 are turned toward the straight-ahead position, hydraulic fluid from the cylinders 21 will flow through conduit 84, conduit 88, conduit 112, port 110 of valve 108, valve 108 and port 107, port 77 and port 80 of valve 45, and conduit 106 to the reservoir 38. When the wheels 20 reach the straight-ahead position, the arm 24 will, through the linkage means 76 and the spring biasing means 77, move the valve 45 to the center position wherein the hydraulic fluid flowing from pump 32 through conduit 98 and port 79 is returned by the valve 45 through port 80 and conduit 106 to the reservoir 38. Since the valve 45 is operated whenever the rear wheels 20 are turned, the dumping valve 44 is provided to prevent the development of any hydraulic fluid pressure by pump 32 during the turning movements. Whenever the forward wheels are turned from the straight-ahead position, the dumping valve 44 will be operated to interconnect ports 72 and 73 of valve 44. The interconnection of ports 72 and 73 of valve 44 completes an obvious circuit including conduit 105 for dumping the fluid from pump 32 into the reservoir 38 thereby preventing the development of any hydraulic pressure by pump 32 which might be applied through valve 45 to the cylinders 21. With no hydraulic fluid pressures being applied through valve 45 to the lock valve 108, the check valve arrangement thereof will prevent any fluid from flowing from conduits 112 or 113 into and through the valve 108.

In the embodiment of FIGURE 2, those elements which are substantially the same as those of FIGURE 1 are designated with the same numerals. Valve 45 of FIGURE 1 is designated valve 115 in FIGURE 2 because the valve has been changed to the extent that in the center position, ports 77 and 78 are blocked by the valve, while ports 79 and 80 are interconnected. Conduit 106 of FIGURE 1 is designated conduit 116 in FIGURE 2 because of the insertion of an orifice 117 in conduit 116 which provides for a slight amount of back pressure at port 80 of valve 115.

The dumping valve 44 of FIGURE 1 is replaced by a dumping valve 118 which is provided with three ports 119, 120 and 121. The valve spool of valve 118 is connected to the spring biasing means 70 which biases the valve to the center position. The spring biasing means 70 is in turn connected to the linkage means 71, which in turn is connected to the tie rod 17 of the front wheel assembly. The valve 118 may be of any suitable type known in the art which will operate in the manner described hereinafter. The valve 118 is arranged so that in the center position, ports 119, 120 and 121 are blocked by the valve 118. When the wheels 14 of the vehicle are turned to the right, the tie rod 17 is moved to the left to operate the valve 118 to a position wherein ports 119 and 121 are interconnected and port 120 is blocked. When the wheels 14 of the vehicle are moved to the left, the tie rod 17 is moved to the right to operate the valve 118 to a position wherein port 119 is blocked and ports 120 and 121 are interconnected.

Two spring biased check valves 122 and 123 are also provided. Each of the check valves 122 and 123 is constructed to substantially freely pass hydraulic fluid therethrough with the creation of a small amount of back pressure.

Conduit 99 from the pump 32 is connected to port 121 of valve 118. Check valve 122 is connected to port 119, while check valve 123 is connected to port 120. The other sides of both check valves 122 and 123 are connected by conduit 124 to the reservoir 38. The check valves 122 and 123 are so positioned that each will pass hydraulic fluid to the reservoir 38 with the creation of some back pressure at ports 119 and 120.

Conduit 126 is connected at one end thereof between check valve 122 and port 119 so that any back pressure at port 119 is applied to conduit 126. The other end of conduit 126 is connected to conduit 36. Conduit 126 is provided with a check valve 127 therein which prevents fluid from flowing from conduit 36 into and through conduit 126 but permits free fluid flow in the opposite direction.

A conduit 128 is connected at one end thereof between check valve 123 and port 120 of valve 118 so that any back pressure at port 120 is applied to conduit 128. Conduit 128 at the other end thereof is connected to conduit 35. Conduit 128 is provided with a check valve 129 which will prevent hydraulic fluid from flowing from conduit 35 into and through conduit 128 but will permit free fluid flow in the opposite direction.

With port 121 blocked when the wheels 14 are in the straight-ahead position, hydraulic fluid pressure may be developed by pump 32 in conduit 98 to center the rear wheels 20 as previously described.

In the operation of the feature providing automatic return of the wheels 14 and 20 to the straight-ahead position, it may first be assumed that with the selector valve 43 in the position for front wheel steering, the steering wheel 33 has been turned to the right to cause the wheels 14 to be turned to the right. When steering effort has ceased, the follow-up cylinder 40 will cause the valve 41 to be returned to its center position as previously described. Since the wheels 14 are turned to the right, the valve 118 will be positioned so that port 119 is interconnected with port 121 and port 120 is blocked. Hydraulic fluid may then flow from pump 32 through conduit 98, conduit 99, port 121 of valve 118, valve 118 and port 119 thereof, check valve 122, and conduit 124 to the reservoir 38. Due to the orifice 117 and the check valve 122, hydraulic back pressure will be developed at port 119 which will be applied through check valve 127 and conduit 126 to conduit 36. The hydraulic pressure in conduit 36 will cause the cylinder 50 to operate the valve 41 to the position wherein ports 52 and 54 are interconnected while ports 53 and 55 are interconnected. Hydraulic fluid from the pump 30 will then be directed through conduit 90, port 54 of valve 41, valve 41 and port 52 thereof, conduit 87, and conduit 83 to the cylinders 12. Hydraulic fluid from the conduit 83 will cause the cylinders 12 to turn the wheels 14 to the left or from the right-hand turned position toward the straight-ahead position. Hydraulic fluid from the cylinders 12 will be returned to the pump 30 over previously described circuits. When the wheels 14 reach the straight-ahead position, valve 118 will be operated by the tie rod 17 to the center position, and flow from pump 32 through conduit 99 will be blocked at port 121 of valve 118. No hydraulic fluid pressure will then be applied through conduit 126 to conduit 36, and valve 41 will return to the center position. Thus it may be seen that as the steering wheel 33 is turned to the right the wheels 14 will be turned to the right, and when turning of the steering wheel 33 is stopped and steering wheel 33 released, the wheels 14 will be automatically returned to the straight-ahead position.

When the steering wheel 33 is turned to the left, the wheels 14 will be turned to the left substantially as previously described, and the valve 118 will be operated to the position wherein port 119 is blocked, and port 120 is interconnected with port 121. The hydraulic back pressure produced at the check valve 123 will then be applied through conduit 128 to conduit 35 and cylinder 51 of valve 41. After turning of the steering wheel 33 is stopped and the follow-up cylinder 40 has reduced the hydraulic pressure in conduit 36 to permit the return of the valve 41 to the center position, the hydraulic pressure in cylinder 51 from conduit 128 will cause the valve 41 to be operated to the position wherein ports 52 and 55 are interconnected, while ports 53 and 54 are interconnected. This operation of the valve 41 will cause hydraulic fluid under pressure from pump 30 to be connected to the cylinders 12 to turn the wheels 14 from the left-hand steered position to the right toward the straight-ahead position. Again, when the straight-ahead position of the wheels 14 is achieved, the valve 118 will be operated to the center position wherein port 121 is blocked. With no hydraulic fluid pressure then being applied to cylinder 51, valve 41 will restore to the center position. Thus it may be seen that after the steering wheel 33 has been turned to the left a certain amount and released, the wheels 14 after having been turned to the left a corresponding amount, will be automatically returned to the straight-ahead position. This automatic return of the wheels 14 to the straight-ahead position from either the left or right-hand steered positions is accomplished because the hydraulic pressure applied to valve 41 from valve 118 is always the opposite of that hydraulic pressure applied to the valve 41 by the steering pump 31.

In describing the operation of the second embodiment of the invention, it is not necessary to describe the operations of the valve 42 for the coordinated and crab steering patterns resulting from operations of the selector valve 43. The previous description of the operations of the embodiment of FIGURE 1 clearly brought out the parallel connection of the cylinders 56 and 57 of valve 42 with cylinders 50 and 51 of valve 41 to the conduits 35 and 36. Therefore it may be seen that when either cylinder 50 or 51 is operated by fluid pressure applied to either conduits 36 or 35, either cylinder 56 or 57 will be operated depending on the operated position of selector valve 43. In considering the operations of the embodiment of FIGURE 2 it should be kept in mind that the same series circuits of FIGURE 1, including the pump 30, the cylinders 12 and the cylinders 21, exist in the embodiment of FIGURE 2, and the rear wheels 20 will also automatically be returned to the straight-ahead position in either in either the coordinated steering pattern or crab steering pattern positions of selector valve 43. The rear wheel centering circuit also remains as an independent function.

Having described the invention, what is considered new and desired to be protected by Letters Patent is:

1. A hydraulic steering system for a motor vehicle having steerable forward and rearward wheel assemblies, hydraulic operating means to steer said assemblies, a steering pump, a first pilot operated valve, a second pilot operated valve, first hydraulic circuit means connecting said first pilot operated valve to said steering pump for operation of said first pilot operated valve responsive to operation of said steering pump, second hydraulic circuit means connecting said second pilot operated valve to said steering pump for operation of said second pilot operated valve responsive to operation of said steering pump and independent of the operation of said first pilot operated valve, a source of hydraulic fluid under pressure, and third hydraulic circuit means interconnecting said source of hydraulic fluid under pressure, said hydraulic operating means and said first and second pilot operated valves for steering movement of said forward and rearward wheel assemblies responsive to the operation of said first and second pilot operated valves by said steering pump.

2. A hydraulic steering system as defined in claim 1, and rear wheel centering means connected to said rear wheel assembly and operating responsive to a steered position of the rearward wheels of said vehicle other than the straight-ahead position for delivering hydraulic fluid under pressure to said rear wheel assembly to align said rear wheel assembly in the straight-ahead position.

3. A hydraulic steering system as defined in claim 2, and lock valve means connected between said rearward wheel assembly and said rearward wheel centering means for blocking any hydraulic fluid flow from said rearward wheel assembly to said rearward wheel centering means when said rearward wheel assembly is steered responsive to the operation of said second pilot operated valve by said steering pump.

4. A hydraulic steering system as defined in claim 2, wherein said rearward wheel centering means includes means stopping any further flow of hydraulic fluid under pressure to said rearward wheel assembly when said rearward wheel assembly is aligned in the straight-ahead position.

5. A hydraulic steering system as defined in claim 1, and a rearward wheel centering pump, a centering valve connected to said rearward wheel assembly and said centering pump and operating responsive to a steered position of the rearward wheels of said vehicle other than the straight-ahead position to deliver hydraulic fluid under pressure from said centering pump to said rearward wheel assembly to align said rearward wheel assembly in the straight-ahead position, and means connected to said centering pump and associated with said forward wheel assembly for preventing said centering pump from developing any hydraulic fluid pressure in any position other than the straight-ahead position of said forward wheel assembly.

6. A hydraulic steering system as defined in claim 5, wherein said centering valve is further formed to operate responsive to a straight-ahead steered position of said rearward wheel assembly to stop any flow of hydraulic fluid under pressure from said centering pump to said rearward wheel assembly.

7. A hydraulic steering system for a motor vehicle having steerable forward and rearward wheel assemblies, hydraulic operating means to steer said assemblies, a steering pump, a first pilot operated valve, a first hydraulic circuit means connecting said first pilot operated valve to said steering pump for operation of said first pilot operated valve responsive to operation of said steering pump, a steering pattern selector valve connected to said steering pump and selectively operable to different positions to direct fluid therethrough in different directions, a second pilot operated valve, second hydraulic circuit means connecting said selector valve to said second pilot operated valve for operation of said second pilot operated valve responsive to operation of said steering pump and said selector valve and independent of the operation of said first pilot operated valve, a source of hydraulic fluid under pressure, and third hydraulic circuit means interconnecting said source of hydraulic fluid under pressure, said hydraulic operating means and said first and second pilot operated valves for steering movement of said forward and rearward wheel assemblies responsive to the operation of said first and second pilot operated valves.

8. A hydraulic steering system for a motor vehicle having steerable forward and rearward wheel assemblies, first hydraulic operating means to steer said forward assembly, second hydraulic operating means to steer said rearward assembly, a steering pump, a first pilot operated valve, a second pilot operated valve, first hydraulic circuit means connecting said first pilot operated valve to said steering pump for operation of said first pilot operated valve responsive to operation of said steering pump, second hydraulic circuit means connecting said second pilot operated valve to said steering pump for operation of said second pilot operated valve responsive to operation of said steering pump and independent of the operation of said first pilot operated valve, a source of hydraulic fluid under pressure, and third hydraulic circuit means connecting said first hydraulic operating means, said first pilot operated valve, said second pilot operated valve, and said second hydraulic operating means in series to said source of hydraulic fluid under pressure for steering movement of said forward and rearward wheel assemblies responsive to the operation of said first and second pilot operated valves.

9. A hydraulic steering system for a motor vehicle having hydraulically steerable forward and rearward wheel assemblies, a steering pump, first hydraulic operating means to steer said forward assembly, second hydraulic operating means to steer said rearward assembly, a first pilot operated valve, a second pilot operated valve, first hydraulic circuit means connecting said first pilot operated valve to said steering pump for operation of said first pilot operated valve responsive to operation of said steering pump, second hydraulic circuit means connecting said second pilot operated valve to said steering pump for operation of said second pilot operated valve responsive to operation of said steering pump and independent of the operation of said first pilot operated valve, a steering pattern selector valve connected to said steering pump and said second pilot operated valve for operation of said second pilot operated valve responsive to the operation of said steering pump and said selector valve, a source of hydraulic fluid under pressure, and third hydraulic circuit means connecting said first hydraulic operating means, said first pilot operated valve, said second pilot operated valve, and said second hydraulic operating means in series to said source of hydraulic fluid under pressure for steering movement of said forward and rearward wheel assemblies responsive to the operation of said first and second pilot operated valves.

10. A hydraulic steering system for a motor vehicle having hydraulically steerable forward and rearward wheel assemblies, hydraulic operating means to steer said assemblies, a steering pump developing hydraulic fluid pressures responsive to the manual rotation of said pump, a first pilot operated valve, a second pilot operated valve, said first and second pilot operated valves being spring biased to a restored position, first hydraulic circuit means connecting said first pilot operated valve to said steering pump for operation of said first pilot operated valve from said restored position responsive to hydraulic fluid pressures developed by said steering pump, second hydraulic circuit means connecting said second pilot operated valve to said steering pump for operation of said second pilot operated valve from said restored position responsive to hydraulic fluid pressures developed by said steering pump and independent of the operation of said first pilot operated valves, a source of hydraulic fluid under pressure, third hydraulic circuit means interconnecting said source of hydraulic fluid under pressure, said hydraulic operating means and said first and second pilot operated valves for steering movement of said forward and rearward wheel assemblies responsive to the operation of said first and second pilot operated valves by hydraulic fluid pressures developed by said steering pump, and a follow-up cylinder means connected to said steering pump and associated with said forward wheel assembly and operating responsive to a steering movement of said forward wheel assembly to cancel any developed hydraulic fluid pressures remaining when said steering pump is stopped after an operation thereof, whereby said first and second pilot operated valves restore.

11. A hydraulic steering system for a vehicle having first hydraulic cylinder means for steering the forward wheels and second hydraulic cylinder means for steering the rearward wheels of said vehicle, a first hydraulically operated valve connected to said first hydraulic cylinder means, a second hydraulically operated valve connected to said second hydraulic cylinder means, a steering pump connected to said first hydraulically operated valve so that said first hydraulically operated valve is operated responsive to operation of said steering pump, means for connecting said second hydraulically operated valve to said steering pump for operating said second hydraulically operated valve responsive to operation of said steering pump and independent of the operation of said first pilot operated valve, a source of hydraulic fluid under pressure connected to said first and second hydraulically operated valves so that hydraulic fluid under pressure is delivered to said first and second hydraulic cylinder means responsive to operations of said first and second hydraulically operated valves.

12. A hydraulic steering system for a vehicle having first and second hydraulic cylinder means for respectively steering the forward and rearward wheels of said vehicle, first hydraulically operated valve means movable between a neutral position and operating position for directing fluid therethrough to said first cylinder to steer said forward wheels, second hydraulically operated valve means movable to operating positions on either side of a neutral position and independent of said first valve means to direct fluid therethrough to said second cylinder to steer said rearward wheels, a hydraulic pump having the pressure side thereof connected with said first hydraulically operated valve means and the suction side thereof connected with said second hydraulically operated valve means, and hydraulic fluid conduit means connecting said first and second hydraulically operated valve means, whereby said forward and rearward wheels of said vehicles are steered in steering patterns dependent upon the operating positions of said first and second hydraulically operated valve means, and hydraulic means for selectively operating said first and second hydraulically operated valves to said operating positions.

13. A hydraulic steering system as defined in claim 12, wherein said hydraulic means for selectively operating said first and second hydraulically operated valves comprises a steering pump and circuit means connecting said steering pump to said first and second hydraulically operated valves, said steering pump being manually operable in different directions to operate said first and second hydraulically operated valves to said different operating positions.

14. A hydraulic steering system as defined in claim 12, wherein said hydraulic means for operating said first and second hydraulically operated valves comprises a steering pattern selector valve connected to said second hydraulically operated valve to selectively control said operating positions of said second hydraulically operated valve, and a steering pump connected in parallel to said first hydraulically operated valve and said selective valve.

15. A hydraulic steering system as defined in claim 14, wherein said operating positions of said first and second valves comprise first and second operating positions, and said second hydraulically operated valve directs fluid from said conduit to the suction side of said hydraulic pump when said steering pump is blocked from said second hydraulically operated valve, and said selector valve is operable to one position to block said steering pump from said second hydraulically operated valve, to a second position to connect said steering pump to said second hydraulically operated valve for movement to said first operating position of said second valve when said first valve is in its first operating position and to a third position to connect said steering pump to said second hydraulically operated valve for movement to said second operating position of said second valve when said first valve is in its first operating position.

16. A hydraulic steering system as defined in claim 12, a centering pump, a rear wheel centering valve connected to said centering pump and associated with the rearward wheels of said vehicle and operating responsive to a steered position of said rearward wheels other than the straight-ahead poistion for delivering hydraulic fluid under pressure from said centering pump to said second hydraulic cylinder means for turning said rearward wheels to the straight-ahead position, and means connected to said centering pump and associated with the forward wheels of said vehicle for preventing the development of any hydraulic fluid under pressure by said centering pump in any position other than the straight-ahead position of said forward wheels.

17. A hydraulic steering system for a vehicle having first and second hydraulic cylinder means for respectively steering the forward and rearward wheels of said vehicle, a first hydraulically operated valve connected to said first hydraulic cylinder means, a pump connected at the pressure side thereof to said first hydraulically operated valve, a second hydraulically operated valve connected to said second hydraulic cylinder means, means connecting said second hydraulically operated valve to the suction side of said pump, a hydraulic fluid conduit connected between said first and second hydraulically operated valves, said first and second hydraulically operated valves being formed so that the pressure side of said pump is connected to said conduit when said first hydraulically operated valve is in a center restored position and said conduit is connected to the suction side of said pump when said second hydraulically operated valve is in a center restored position, said first hydraulically operated valve being further formed so that the pressure side of said pump and said conduit are connected to said first hydraulic cylinder means for steering of said forward wheels to the right when said first hydraulically operated valve is operated to a first position on one side of said center position and so that the pressure side of said pump and said conduit are connected to said first hydraulic cylinder means for steering of said forward wheels to the left when said first hydraulically operated valve is operated to a second position on the other side of said center position, said second hydraulically operated valve being further formed so that said conduit and the suction side of said pump are connected to said second hydraulic cylinder means for steering said rearward wheels to the right when said second hydraulically operated valve is operated to a first position on one side of said center position and so that said conduit and the suction side of said pump are connected to said second hydraulic cylinder means for steering of said rearward wheels to the left when said second hydraulically operated valve is operated to a second position on the other side of said center position, a steering pump connected to said first hydraulically operated valve and being operable in one direction to deliver hydraulic fluid under pressure to said first hydraulically operated valve to operate said first hydraulically operated valve to said first position from said center position and operable in another direction to deliver hydraulic fluid under pressure to said first hydraulically operated valve to operate said first hydraulically operated valve to said second position from said center position, and means connecting said second hydraulically operated valve to said steering pump for delivering hydraulic fluid under pressure from said steering pump to said second hydraulically operated valve for operation thereof to said first and second positions thereof.

18. A hydraulic steering system as defined in claim 17, wherein said means connecting said steering pump to said second hydraulically operated valve comprises a manually operable selector valve operable to one position to block any hydraulic fluid under pressure from said steering pump to said second hydraulically operated valve, to a second position to connect hydraulic fluid under pressure from said steering pump to said second hydraulically operated valve to operate said second hydraulically operated valve to said first and second positions when said first hydraulically operated valve is respectively operated to said first and second positions and to a third position to connect hydraulic fluid under pressure from said steering pump to said second hydraulically operated valve to operate said second hydraulically operated valve to said second and first positions when said first hydraulically operated valve is respectively operated to said first and second positions.

19. A hydraulic steering system for a motor vehicle having hydraulically steerable forward and rearward wheel assemblies, a steering pump, a first pilot operated valve, a second pilot operated valve, first hydraulic circuit means connecting said first pilot operated valve to said steering pump for operation of said pilot operated valve responsive to operation of said steering pump, second hydraulic circuit means connecting said second pilot operated valve to said steering pump for operation of said second pilot operated valve responsive to operation of said steering pump, a source of hydraulic fluid under pressure, third hydraulic circuit means interconnecting said source of hydraulic fluid under pressure, said forward and rearward wheel assemblies and said first and second pilot operated valves for steering movement of said forward and rearward wheel assemblies responsive to the operation of said first and second pilot operated valves by said steering pump, a rearward wheel centering pump, a centering valve connected to said rearward wheel assembly and said centering pump and operating responsive to a steered position of the rearward wheels of said vehicle other than the straight-ahead position to deliver hydraulic fluid under pressure from said centering pump to said rearward wheel assembly to align said rearward wheel assembly in the straight-ahead position, means including an unloading valve connected to said centering pump and associated with said forward wheel assembly for preventing said centering pump from developing any hydraulic fluid pressure in any position other than a straight-ahead position of said forward wheel assembly, and further including a fourth hydraulic circuit means connecting said unloading valve to said first and second pilot operated valves and operating responsive to a steered position of the forward wheels of said vehicle other than the straight-ahead position for operating said first and second pilot operated valves for turning said forward and rearward wheels to the straight-ahead position when said steering pump is released.

20. A hydraulic steering system for a motor vehicle having steerable forward and rearward wheel assemblies, the improvement comprising first hydraulic operating means to steer said forward assembly, second hydraulic operating means to steer said rearward assembly, hydraulic fluid pressure means, first valve means for selectively interconnecting said pressure means and said first operating means, second valve means independent of said first valve means, for selectively interconnecting said pressure means and said second operating means, and steering means to operate said first and second valve means for selective steering movement of said forward and rearward wheel assemblies.

21. A hydraulic steering system for a vehicle having first and second hydraulic cylinder means for respectively steering the forward and rearward wheels of said vehicle, a first hydraulically operated valve connected to said first hydraulic cylinder means and operable to different positions to direct fluid therethrough in different directions to steer said forward wheels in different directions, a second hydraulically operated valve connected to said second hydraulic cylinder means and operable to different positions to direct fluid therethrough in different directions to steer said rearward wheels in different directions, a pump having the pressure side thereof connected to said first hydraulically operated valve and the suction side thereof connected to said second hydraulically operated valve, and a hydraulic fluid conduit connected between said first and second hydraulically operated valves, whereby said forward and rearward wheels of said vehicles are steered in steering patterns dependent upon the operated positions of said first and second hydraulically operated valves, hydraulic means for selectively operating said first and second hydraulically operated valves to different positions, a source of hydraulic fluid under pressure for centering said rearward wheels, and a rear wheel centering valve connected to said hydraulic fluid under pressure and associated with the rearward wheels of said vehicle and operating responsive to a steered position of said rearward wheels other than the straight-ahead position for delivering hydraulic fluid under pressure from said centering pump to said second hydraulic cylinder means for turning said rearward wheels to the straight-ahead position.

22. A hydraulic steering system as defined in claim 21, and lock valve means connected between said second hydraulic cylinder means and said rear wheel centering valve for preventing any flow of hydraulic fluid from said second hydraulic cylinder means to said rear wheel centering valve when said rearward wheels are steered responsive to operation of said second hydraulically operated valve.

23. A hydraulic steering system as defined in claim 21, wherein said rear wheel centering valve is further formed to operate responsive to a straight-ahead position of said rearward wheels for stopping any flow of hydraulic fluid under pressure from said source of hydraulic fluid under pressure to said second hydraulic cylinder means.

24. A hydraulic steering system for a vehicle having first and second hydraulic cylinder means for respectively steering the forward and rearward wheels of said vehicle, a first hydraulically operated valve connected to said first hydraulic cylinder means and operable to different positions to direct fluid therethrough in different directions to steer said forward wheels in different directions, a second hydraulically operated valve connected to said second hydraulic cylinder means and operable to different positions to direct fluid therethrough in different directions to steer said rearward wheels in different directions, a pump having the pressure side thereof connected to said first hydraulically operated valve and the suction side thereof connected to said second hydraulically operated valve, a hydraulic fluid conduit connected between said first and second hydraulically operated valves, whereby said forward and rearward wheels of said vehicle are steered in steering patterns dependent upon the operated positions of said first and second hydraulically operated valve means, hydraulic means for selectively operating said first and second hydraulically operated valves to different positions, a centering pump, a rear wheel centering valve connected to said centering pump and associated with the rear wheels of said vehicle and operating responsive to a steered position of said rearward wheels other than the straight-ahead position for delivering hydraulic fluid under pressure from said centering pump to said second hydraulic cylinder means for turning said rearward wheels to the straight-ahead position, said rear wheel centering valve operable to vent any hydraulic fluid under pressure from said centering pump when said rearward wheels are in the straight-ahead position.

25. A hydraulic steering system for a vehicle having first and second hydraulic cylinder means for respectively steering the forward and rearward wheels of said vehicle, a first hydraulically operated valve connected to said first hydraulic cylinder means and operable to different positions to direct fluid therethrough in different directions to steer said forward wheels in different directions, a second hydraulically operated valve connected to said second hydraulic cylinder means and operable to different positions to direct fluid therethrough in different directions to steer said rearward wheels in different directions, a pump having the pressure side thereof connected to said first hydraulically operated valve and the suction side thereof connected to said second hydraulically operated valve, a hydraulic fluid conduit connected between said first and second hydraulically operated valves, whereby said forward and rearward wheels of said vehicles are steered in steering patterns dependent upon the operating positions of said first and second hydraulically operated valves, hydraulic means for selectively operating said first and second hydraulically operated valves to different positions, a centering pump, a rear wheel centering valve connected to said centering pump and associated with the rearward wheels of said vehicle and operating responsive to a steered position of said rearward wheels other than the straight-ahead position for delivering hydraulic fluid under pressure from said centering pump to said second hydraulic cylinder means for turning said rearward wheels to the straight-ahead position, and means connected to said centering pump and associated with the forward wheels of said vehicle for preventing the development of any hydraulic fluid under pressure by said centering pump in any position other than the straight-ahead position of said forward wheels, said means connected to said centering pump including a valve venting the pressure side of said centering pump.

References Cited by the Examiner
UNITED STATES PATENTS

| | | | |
|---|---|---|---|
| 867,282 | 10/07 | Macfarren | 180—79.2 |
| 2,381,109 | 8/45 | Cartlidge | 180—6.48 |
| 2,512,979 | 6/50 | Strother | 180—79.2 |
| 3,101,808 | 8/63 | Gordon | 180—79.2 |

A. HARRY LEVY, *Primary Examiner.*

PHILIP ARNOLD, *Examiner.*